United States Patent [19]

Grevich

[11] Patent Number: 5,387,002
[45] Date of Patent: Feb. 7, 1995

[54] WHEELED SUPPORT FOR SLIP-IN CAMPER

[76] Inventor: John J. Grevich, R.R. 1, Box 80, Star Prairie, Wis. 54026

[21] Appl. No.: 131,404

[22] Filed: Oct. 1, 1993

[51] Int. Cl.[6] ............................................. B60P 3/335
[52] U.S. Cl. .............................. 280/406.2; 280/476.1; 296/168
[58] Field of Search ............... 280/476.1, 406.2, 432, 280/455.1, 457, 459; 296/156, 164, 166, 169, 168, 181, 182

[56] References Cited

U.S. PATENT DOCUMENTS

| | | | |
|---|---|---|---|
| 2,517,047 | 8/1950 | Spitler | 280/406.2 |
| 3,532,236 | 10/1970 | Hostetler | 296/164 |
| 3,556,558 | 1/1971 | McKee | 280/406.2 |
| 3,667,799 | 6/1972 | Shyrock | 296/168 |
| 5,180,205 | 1/1993 | Shoop | 296/181 |

*Primary Examiner*—Margaret A. Focarino
*Assistant Examiner*—Anne Marie Boehler
*Attorney, Agent, or Firm*—Palmatier, Sjoquist & Helgut

[57] ABSTRACT

The invention relates to a wheeled trailer support device for use with a slip-in camper which is engaged to the box of a pickup truck. The invention enables an individual to use a slip-in camper of extended length with a standard sized box of a pickup truck. The invention includes a platform having an engagement face which slides along a friction plate which is mounted to the underside of the slip-in camper. The towing arm of the invention permits the trailer to track a curved road while simultaneously supporting the extended length of the slip-in camper. Separation of the wheeled trailer support device from the underside of slip-in camper is thereby eliminated. Wear upon a trailer and/or trailer tires is simultaneously minimized.

20 Claims, 3 Drawing Sheets

WHEELED SUPPORT FOR SLIP-IN CAMPER

BACKGROUND OF THE INVENTION

This invention relates to a wheeled support device for use in carrying a slip-in camper which is transported within the box of a pickup truck. In the past, the length or size of a slip-in camper was generally limited to the length of the box of a pickup truck. A slip-in camper generally did not extend rearward from the bumper of a pickup for a length in excess of two feet. A slip-in camper extending more than two feet beyond the rear of pickup truck created a weight distribution problem, which either elevated the front end of the pickup truck, or caused the front of the camper to lift off and disengage the box of the pickup truck during transportation.

In the past, attempts have been made to use a boat style of trailer to support the additional length and weight of an extended length slip-in camper. These trailers functioned inadequately, due to the fixed positioning of the trailer with respect to the camper. The fixed positioning of a trailer caused excessive wear on the tires and frame of the trailer. In addition, boat style trailers were frequently sheared from the underside of a slip-in camper during travel around corners. In addition, a slip-in camper of extended length, when used with a boat style of trailer, frequently exhausted the available suspension which caused the camper to bounce, risking disengagement from the box of a pickup truck.

SUMMARY OF THE INVENTION

The invention relates to a wheeled trailer support device for use with a slip-in camper which is engaged to the box of a pickup truck. The invention enables an individual to use a slip-in camper of extended length with a standard sized box of a pickup truck. The invention includes a platform having an engagement face which slides along a friction plate which is mounted to the underside of the slip-in camper. The towing arm of the invention permits the trailer to track a curved road while simultaneously supporting the extended length of the slip-in camper. Separation of the wheeled trailer support device from the underside of slip-in camper is thereby eliminated. Wear upon a trailer and/or trailer tires is simultaneously minimized.

It is an object of the present invention to provide a new and improved wheeled trailer support device for use with a slip-in camper of relatively simple and inexpensive design, construction, and operation which is safe and which fulfills the intended purpose of supporting the extended length of a slip-in camper without fear of injury to persons and/or damage or property.

It is another object of the present invention to provide arcuate movement of the wheeled trailer device to support an extended style of slip-in camper through curves and around corners.

It is still another object of the present invention to provide a wheeled trailer support device for an extended style of slip-in camper which permits quick and efficient separation from the box of a pickup truck.

It is still another object of the present invention to provide a wheeled trailer support device which evenly distributes weight and eliminates elevation of the front end of a pickup during transportation of an extended style of slip-in camper.

It is still another object of the present invention to reduce the risk of inadvertent disengagement of a slip-in camper from the box of a pickup truck.

It is still another object of the present invention to reduce the bouncing of a slip-in camper with respect to the box of a pickup truck during travel over rough road surfaces.

A feature of the present invention includes a bracket having a towing ball affixed to the frame of a slip-in camper proximal to the rear bumper of a pickup truck.

Another feature of the present invention includes a frame having a base and a towing arm having a ball hitch for engagement to the towing ball.

Still another feature of the present invention includes a platform having an engagement face extending upwardly from the base for side-to-side sliding contact along an arc-shaped friction plate which is affixed to the underside of a slip-in camper.

Still another feature of the present invention includes a pair of wheels having independent suspension for support of a slip-in camper.

Still another feature of the present invention includes a ledge plate having a notch which extends rearwardly from the base of the frame.

Still another feature of the present invention includes a homing rod affixed to the slip-in camper for releasable engagement into the notch permitting side-to-side arcuate movement of the wheeled support trailer device with respect to the slip-in camper.

Still another feature of the present invention includes a spring operated means which engages and returns the homing rod into the notch following the return of alignment of the wheeled trailer support device to the pickup truck.

Still another feature of the present invention includes an arcuate-shaped friction plate which is formed of a high density polyethylene material.

DETAILED SPECIFICATION OF THE PREFERRED EMBODIMENT

Figure 1:
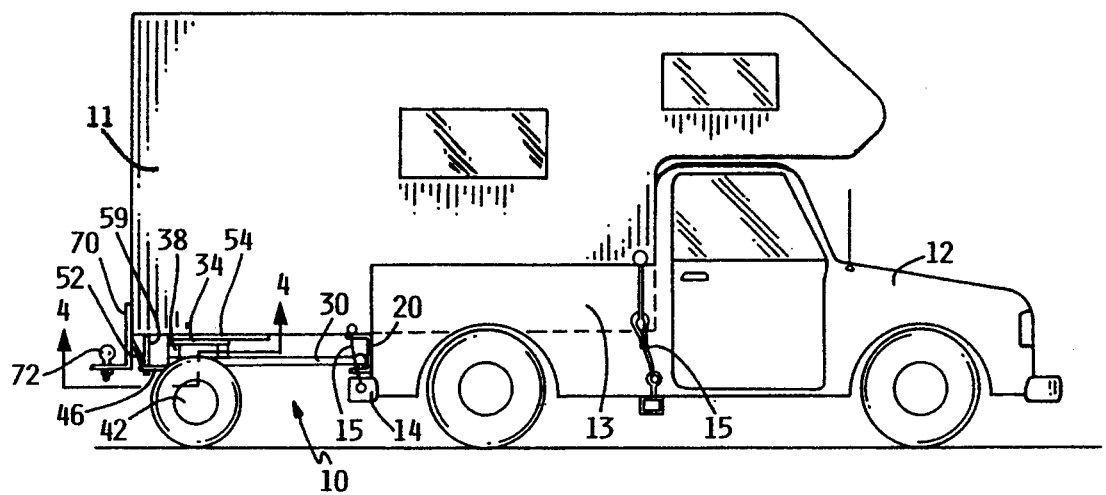
FIG. 1 is a side environmental view of the invention engaged to a slip-in camper and a pickup truck.

One form of the invention is illustrated and described herein. In general, the trailer support device is indicated by the numeral 10. The trailer support device 10 includes a bracket 20 having a towing ball 22, a frame 24 having a base 26, a pair of support members 28 and a towing arm 30 having a ball hitch 32, a platform 34 having an engagement face 36 and a plurality of support braces 38, a hub 40, a pair of wheels 42 including a support means 44, a ledge plate 46 having a notch 48, a releasable latching means 50, a spring operated means 52, and a sliding bearing means 54.

The trailer support device 10 is preferably used in conjunction with a slip-in style camper 11 and a one-half ton pickup truck 12. The pickup truck 12 preferably includes a box 13 which does not include a tail gate. The slip-in camper 11 preferably includes a lower frame (not shown) which is positioned for engagement to the box 13 of the pickup truck 12. (FIG. 1)

Generally, the pickup truck 12 includes a rear bumper 14 as known in the art. The slip-in camper 11 is preferably engaged to the box 13 of pickup truck 12 at four locations by chain and log binders 15 as is known in the art. The chain and log binders 15 may be affixed to the rear bumper 14 and to a square tubing positioned under the frame of the pickup truck 12 proximal to the cab. The slip-in camper 11 may alternatively be fastened to the box 13 of a pickup truck 12 by any preferred means without adversely affecting the operation and performance of the wheeled trailer support device 10. It should be noted that the use of chain and log binders 15 permits the quick locking and unlocking of a slip-in camper 11 to a pickup truck 12, facilitating storage of the camper. It is expected that an operator, following elevation of a slip-in camper 11 from the box 13 of a pickup truck 12, may simply drive the pickup truck 12 away for storage of the camper following the raising of the slip-in camper 11 by the jack means 17 which are preferably located proximal to each corner of the slip-in camper 11.

The slip-in camper 11 generally extends rearward from the bumper 14 of the pickup truck 12 a distance approximating fourteen feet. The slip-in camper 11 may extend rearward from the box 13 for any desired distance which may exceed fifteen feet at the preference of an individual. It should be noted that the additional weight attributable to the portion of the slip-in camper 11 overhanging the rear of a pickup 12 may cause the separation of the slip-in camper 11 from the box 13, or cause the elevation of the front end of the pickup truck 12, if a wheeled trailer support device 10 is not used. It is estimated that the weight of a slip-in camper 11 having an extended length does not exceed 1,500 to 1,700 pounds. The load capacity for the wheeled trailer support device 10 is thereby estimated to be in the range of 800 to 1,000 pounds. The wheeled trailer support device 10 preferably levels the orientation of a pickup truck 12 hauling a slip-in camper 11. It should also be noted that the use of an extended style of slip-in camper 11 does not require an individual to obtain special license plates. In the past, an individual was frequently prohibited from using a slip-in camper 11 having an extended length due to weight load considerations for a pickup truck. In the past, an individual using a longer slip-in camper has frequently been required to use a longer pickup truck having up to a one ton load capacity.

Figure 5:
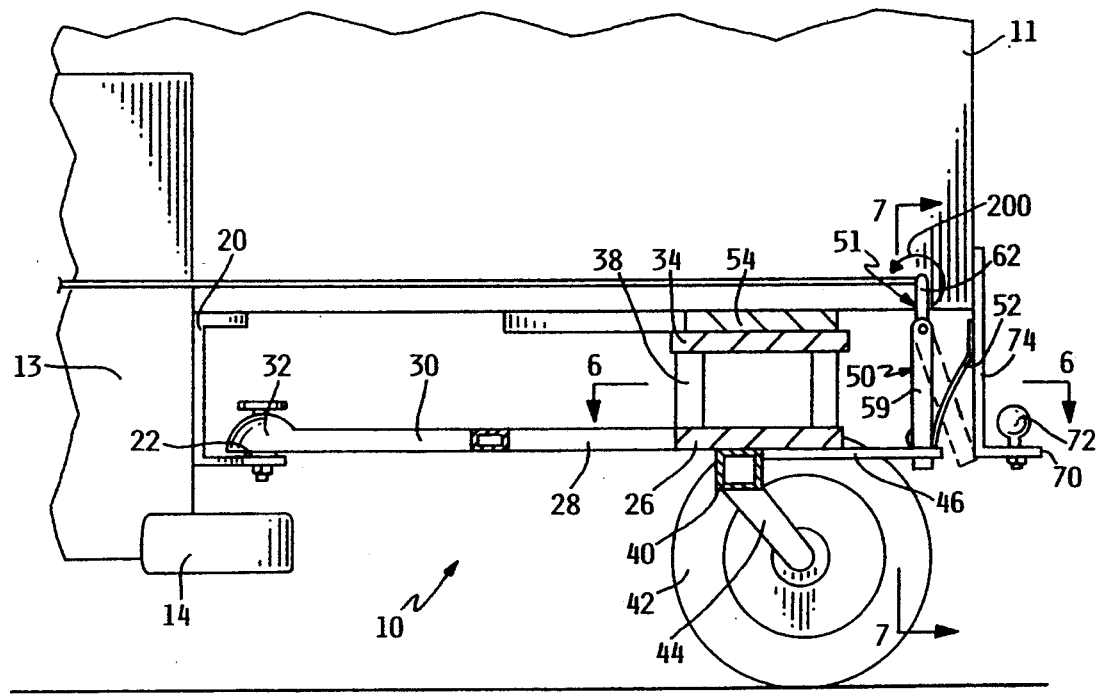
FIG. 5 is a cross-sectional side view of the invention taken along the lines 5—5 of FIG. 4.

As seen in FIG. 5, a bracket 20 is affixed to the frame of the extended portion of the slip-in camper 11 proximal to the rear bumper 14 of a pickup truck 12. The bracket 20 is generally U-shaped and is formed of a sturdy metal material. The bracket 20 may be attached to the frame of the slip-in camper 11 by any preferred means, including but not limited to, welding and/or the use of nuts and bolts. The bracket 20 includes a centrally positioned towing ball 22 as is known in the art. The towing ball 22 may be of any preferred size, and preferably approximates a standard 1⅞ inch diameter ball hitch. The towing ball 22 may be attached to the bracket 20 by a threaded post and nut as is known in the art.

The bracket 20 functions to attach the wheeled trailer support device 10 to the frame of the slip-in camper 11. The bracket 20 is securely affixed to the frame of the slip-in camper 11 preventing inadvertent or involuntary separation during use. The towing ball 22 functions to permit pivotal side-to-side movement of the wheeled trailer support device 10 with respect to the slip-in camper 11, during transportation around corners and through curves.

The elongate frame is indicated in general by the numeral 24. The elongate frame 24 is generally formed of a base 26, a pair of support members 28, and a towing arm 30 having a ball hitch 32. The elongate frame 24 generally extends rearward from the bracket 20 for positioning of the base 26 below the portion of the slip-in camper 11 furthest from the box 13 of the pickup truck 12.

The base 26 is preferably rectangular in shape and is formed of a sturdy metal material. The base 26 includes substantially flat upper and lower surface portions.

The towing arm 30 is preferably centrally affixed to, and extends forward from the base 26. The towing arm 30 may be affixed to the base 26 by an preferred means, including but not limited to, welding and/or the use of nuts and bolts. The towing arm 30 may be of any preferred length and shape as desired by an individual. (FIG. 2) The towing arm 30 preferably approximates six feet in length and is formed of a sturdy metal material. The towing arm preferably positions the base 26 at least five feet rearward of a pickup 12. Towing arm 30 may have a diameter dimension approximating four to six inches at the preference of an individual.

The towing arm 30 preferably includes a ball hitch 32 having a handle. The ball hitch 32 is preferably adapted for receiving engagement over the towing ball 22 of the bracket 20. The towing arm 30 becomes affixed to the bracket 20 following the rotation of the handle which affixes the ball hitch 32 to the towing ball 22. The towing arm 30 is preferably pivotally engaged to the bracket 20 such that the trailer support device 10 may move from side to side along an arcuate path with respect to the underside of a slip-in camper 11. The pivotal interaction between the towing ball 22 and the ball hitch 32 provides the mechanism for the movement of the trailer support device 10 with respect to the slip-in camper 11.

A pair of support members 28 are preferably attached to the base 26 and to the towing arm 30. Each support member 28 is preferably affixed to the base 26 by welding, extending forwardly for engagement to the towing arm 30 at a location substantially equal distances between the base 26 and the bracket 20. Each support member 28 diverges outwardly from the towing arm 30 for engagement to the base 26 proximal to a corner. (FIG. 2) Each support member 28 is preferably formed of a sturdy metal material and is preferably affixed to the towing arm 30 by welding. The support members 28 function to enhance the strength and durability of the frame 24. It is expected that the base 26, towing arm 30, and pair of support members 28 are of sufficient strength and durability to not bend, fracture or fail during use in the support of a slip-in camper 11 over rough road surfaces. It should be noted that the preferred diameter dimension for each of the support members 28 may be smaller, equal to, or larger than the diameter dimension of the towing arm 30, at the preference of an individual.

A platform 34 is preferably affixed to, and extends upwardly from, the upper surface portion of the base 26. The platform 34 is preferably formed of a sturdy metal material and is affixed to the base 26 by welding.

The platform 34 preferably includes an engagement face 36 and a plurality of support braces 38. The platform 34 functions as the portion of the wheeled trailer support device 10 engaged to the portion of the slip-in camper 11 extending rearward beyond box 13 of the pickup truck 12.

The plurality of support braces 38 are preferably formed of a sturdy metal material and are affixed to the upper surface portion of the base 26 by welding. Preferably a support brace 38 is positioned proximal to each corner of the base 26, extending upwardly therefrom, for support of the engagement face 36. It should be noted that the support braces 38, in combination, are of sufficient strength and durability to not fracture, bend, or fail during exposure to load forces which may exceed 800 pounds.

Figure 2:
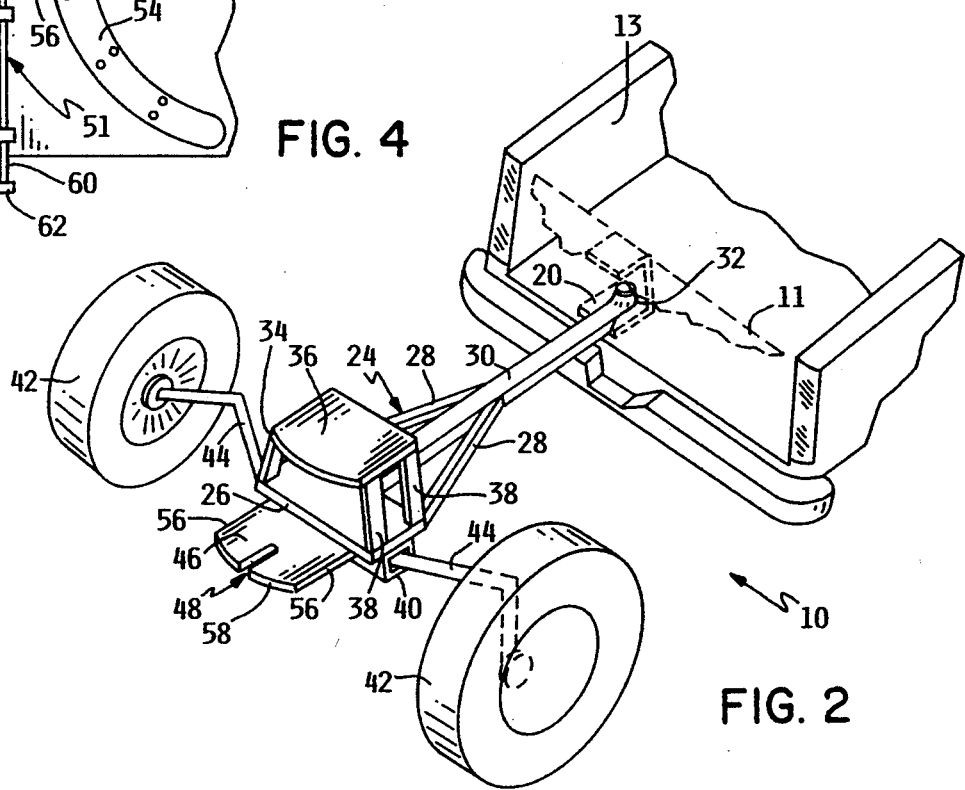
FIG. 2 is an isometric view of the invention.

As seen in FIG. 2, the support braces 38 may be aligned to diverge centrally inward from the base 26. The platform 34 thereby has a truncated pyramid shape. (FIG. 2) It should also be noted that the length of each support brace 38 is equal, and has any preferred dimension as desired by an individual. The trailer support device 10 may thereby be easily adapted for use with a variety of manufacturers or models of slip-in campers 11.

The engagement face 36 is preferably rectangular in shape and may, however, include an arcuate shape at the preference of an individual. The engagement face 36 is preferably formed of a sturdy metal material of sufficient strength and durability to support of a portion of a slip-in camper 11 during transportation of the wheeled trailer support device 10. The engagement face 36 may be coated with a friction-reducing material, such as a high density polyethylene or polyteflon material, or rollers formed of hard rubber having dimensions of two inches for diameter and four inches for length at the preference of an individual. The engagement face 36 preferably functions to support, and slidably engage, the portion of the slip-in camper 11 extending rearward from the box 13 of a pickup truck 12. It is anticipated that the engagement face 36 easily slides from side to side along an arcuate path during the support of a slip-in camper 11 without snagging when exposed to substantial weight loads. It is also expected that the engagement face 36 does not cause any damage or wear to either the sliding bearing means 54 or the underside of the slip-in camper 11 during transportation of the wheeled trailer support device 10.

A hub 40 is preferably centrally affixed to the lower surface portion of the base 26. The hub 40 is preferably positioned substantially parallel to the rear bumper 14 of the pickup truck 12, and is substantially perpendicular to the towing arm 30. The hub 40 is preferably square tubular in shape and is formed of a sturdy metal material of sufficient strength and durability to not separate from the base 26 during use of the wheeled trailer support device 10. The hub 40 is preferably affixed to the lower surface portion of the base 26 by welding. The hub 40 functions to attach the frame 24 and platform 34 to a pair of wheels 42, via the support means 44. The hub 40 functions to provide a portion of the mechanism for the suspension and movement of the wheeled trailer support device 10 when used to support a slip-in camper 11. It should be noted that the hub 40 may be of any preferred type at the discretion of an individual provided that the essential features, functions, and attributes described herein are not sacrificed.

The wheeled trailer support device 10 includes a standard pair of rubber wheels or tires 42 which are attached to the hub 40 via the support means 44. Any preferred size/width of tires 42 may be available for use with the wheeled trailer support device 10 as desired by an individual. The tires 42 preferably do not experience inordinate or excess wear during use as a portion of the wheeled trailer support device 10. The useful life and safety of the tires 42 is thereby significantly enhanced.

The support means 44 preferably include independent torsion arms positioned between, and affixed to, the hub 40 and the wheels 42. The support means 44 are preferably of sufficient strength and durability to support the frame 24 and the additional weight of an extended length of slip-in camper 11 over rough road surfaces. The independent torsion arms are preferably formed for exposure to heavy loads and strenuous operational conditions.

The support means 44 preferably prevent the bouncing of the slip-in camper within the box 13 of the pickup truck 12 and/or the separation of the slip-in camper 11 from the box 13 of a pickup truck 12 during travel over rough road conditions. It should be noted that alternative independent support means 44 may be used at the preference of an individual provided that the essential functions, features, and attributes described herein are not sacrificed.

Figure 6:
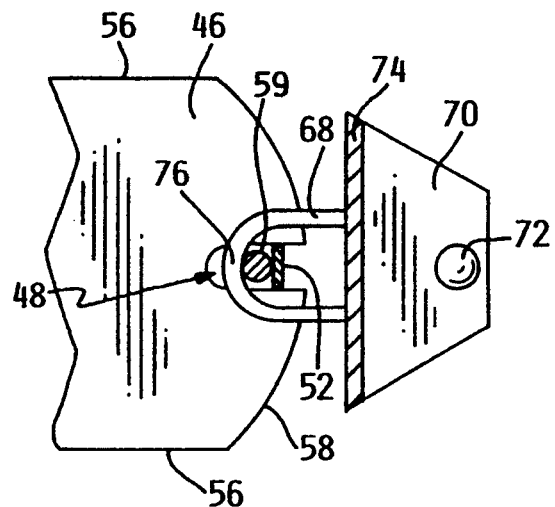
FIG. 6 is a cross-sectional detail top view of the invention taken along the line 6—6 of FIG. 5.

A ledge plate 46 is preferably affixed to, and depends rearwardly from, the base 26. The ledge plate 46 is preferably formed of a sturdy metal material and is attached to the base 26 by welding. The ledge plate 46 preferably includes two parallel edges 56 and an arcuate edge 58. A notch 48 is centrally positioned, traversing the arcuate edge 58 approximately equal distances between the two parallel edges 56. (FIGS. 2, 6) The ledge plate 46 is preferably on a plane below the base 26 and is attached to the lower surface portion of the base 26 proximal to the hub 40. (FIGS. 5, 1) It should be noted that the ledge plate 46 may be of any preferred size and shape as desired by an individual provided that the essential functions, features and attributes described herein are not sacrificed.

The ledge plate 46 preferably extends rearwardly for positioning of the arcuate edge 58 proximal to a hypothetical plane extending downward from the rear of the slip-in camper 11.

The notch 48 is preferably of sufficient size for receiving engagement of the releasable latching means 50. The notch 48 extends forward from the arcuate edge 58 approximately three inches and has a width approximating one and one-half inches.

The arcuate edge 58 is shaped to facilitate engagement of the releasable latching means 50 to the ledge plate 46 during transportation of the wheeled trailer support device 10. The notch 48 preferably provides the mechanical means for fixedly positioning the wheeled trailer support device 10, preventing side-to-side movement with respect to the slip-in camper 11, when the wheeled trailer support device 10 is aligned with the pickup truck 12. It is expected that the arcuate edge 58 facilitates the sliding engagement of the releasable latching means 50, along the arcuate edge 58, until the releasable latching means 50 is aligned to the notch 48. The spring operated means 52 then positions the releasable latching means 50 into locking engagement with the notch 48. The ledge plate 46 is of sufficient strength and durability to not fracture or fail if forces are exerted against notch 48 following locking engagement to the releasable latching means 50.

The ledge plate 46 functions to fixedly position the trailer support device 10 with respect to the slip-in camper 11, and pickup truck 12, during use. Alternatively, the ledge plate 46 may contain an aperture for engagement to a solenoid latch having a plunger/piston as is known in the art.

The releasable latching means 50 is preferably affixed to and depends from the releasing means 51. The releasable latching means 50 preferably includes a homing rod 59 which is integrally affixed to a release rod 60, which in turn is attached to a lever 62. The homing rod 59 and release rod 60 are preferably pivotally attached to the underside of the slip-in camper 11 by brackets holding ball bearing arrangements 64. (FIGS. B, 4, 5) The release rod 60, lever 62, and brackets holding the ball bearing components comprise the releasing means 51.

The homing rod 59 is preferably formed of one-piece construction of a sturdy metal material. The homing rod 59 approximates one foot in length and is cylindrical in shape. The homing rod 59 may be of any shape as preferred by an individual provided that the essential functions, features and attributes described herein are not sacrificed. The homing rod 59 is preferably adapted for pivotal and penetrating engagement into the notch 48 of the ledge plate 46. The homing rod 59 is positioned in a substantially vertical orientation depending from a position proximal to the underside of the slip-in camper 11 to a location below the ledge plate 46. The homing rod 59 is preferably perpendicular to the ledge plate 46.

Figure 4:
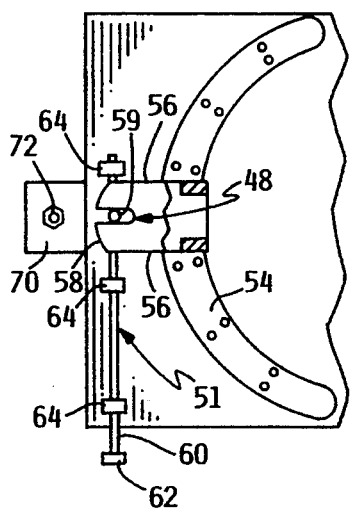
FIG. 4 is a detailed top view of the friction plate.
Figure 3:
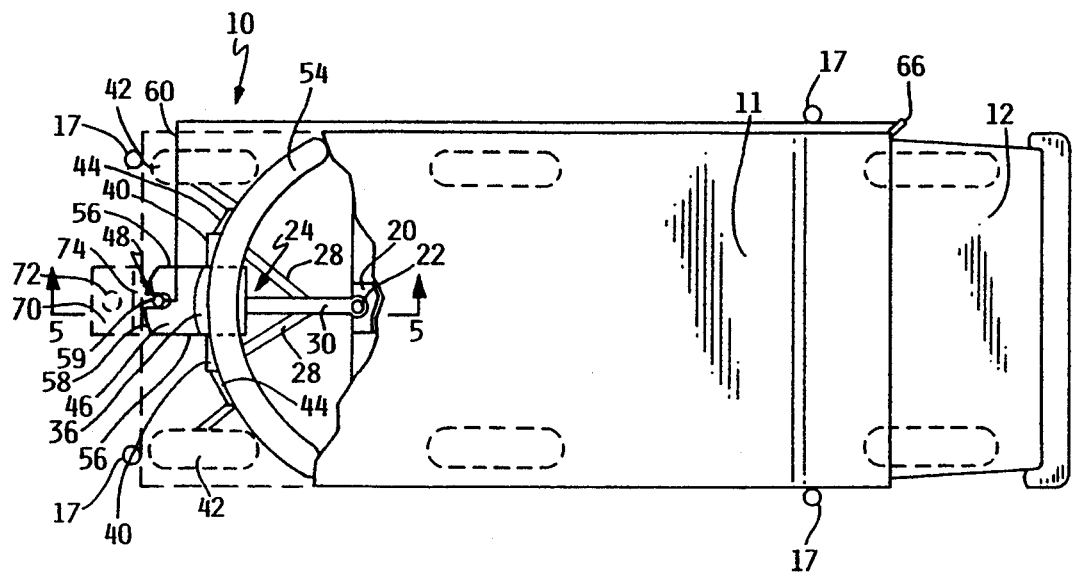
FIG. 3 is a top partial phantom line, partial cutaway view of the invention.
Figure 7:
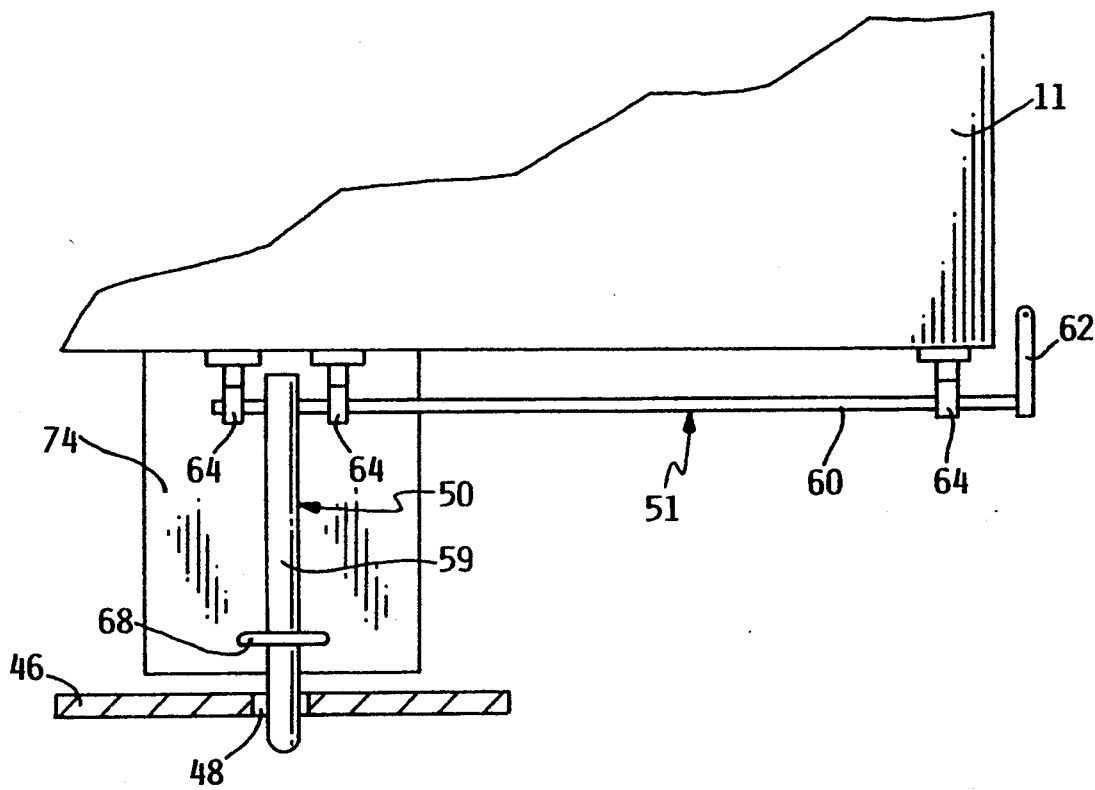
FIG. 7 is a cross-sectional detail view of the invention taken along the line 7—7 of FIG. 5.

The homing rod 59 is rigidly and integrally attached to the release rod 60, depending therefrom, for penetrating and pivotal engagement into the notch 48 (FIG. 7, 5) The homing rod 59 is preferably fixed to the release rod 60 by welding. It should be noted that the homing rod 59 may be affixed to the release rod 60 by any means as preferred by an individual. Rotation of the release rod 60 in a counterclockwise direction as indicated by arrow 200 of the FIG. 5, pivots the homing rod 59 rearwardly disengaging the homing rod 59 from the notch 48. The wheeled trailer support device 10 is thereby permitted to move from side to side along an arcuate path as shown in FIGS. 3 and 4. Rotation of the release rod 60 in the opposite or clockwise direction, causes the homing rod 59 to pivot forwardly into a position for engagement to the arcuate edge 58 or notch 48. The homing rod 59 prevents side-to-side arcuate movement of the wheeled trailer support device 10, with respect to the slip-in camper 11, when the homing rod 59 is positioned within the notch 48. The homing rod 59 is of sufficient strength and durability to not fracture, break, bend or shear from the underside of the slip-in camper 11 when exposed to lateral forces which may be caused by a road surface during use of the wheeled trailer support device 10.

The releasing means 51 includes a release rod 60 which is preferably cylindrical in shape and is formed of a sturdy metal material. The release rod 60 preferably approximates four feet in length and extends to the exterior of the slip-in camper 11 on the same side of the camper as the driver's door of the pickup truck 12. The release rod 60 may have any diameter dimension at the preference of an individual. The release rod 60 is substantially parallel to the rear of the slip-in camper 11.

The releasing means 51 includes a lever 62 which is positioned to the exterior of the slip-in camper 11 on the same side as the driver's door of the pickup truck 12. (FIG. 7, 3) The lever 62 is preferably formed of a sturdy metal material and is welded to the release rod 60. The lever 62 is preferably affixed to and extends substantially vertically upward from the release rod 60. The lever 62 includes an aperture which functions as the location for engagement to a cable which extends forwardly along the driver's side of the slip-in camper 11 for engagement to a handle 66 positioned proximal to the driver's door. The handle 66 is pivotally affixed to the pickup truck 12 such that a driver may rotate the handle 66 in a forward direction "on the fly" during transportation of a slip-in camper 11. The forward pivotal rotation of the handle 66 causes the forward pivotal rotation of the lever 62, which in turn causes the counterclockwise rotation (arrow 200 FIG. 5) of the release rod 60, which in turn pivots the homing rod 59 against the spring operated means 52, for release of the homing rod 59 from the notch 48. The wheeled trailer support device 10 may then move from side to side along an arcuate path with respect to the slip-in camper 11 during travel around corners or through curves. A driver may then release the handle 66 which causes the spring operated means 52 to bias the homing rod 59 towards the ledge plate 46. The homing rod 59 then engages the arcuate edge 58 until such time as the homing rod 59 becomes aligned to the notch 48. Upon alignment with the notch 48, the spring operated means 52 forwardly positions the homing rod 59 into coupling engagement with the notch 48. The release rod 60 then rotates in a clockwise direction, causing the lever 62 to pivot in an upward and rearward direction acquiring a substantially vertical orientation, which in turn causes the cable to pull the handle 66 rearwardly to a substantially vertical position proximal to the driver's door of a pickup truck 12. It should be noted that a locking mechanism may be affixed to the pickup truck 12 proximal to the handle 66 for maintaining the handle 66 in a forward pivoted position, which continuously decouples or releases the homing rod 59 from the notch 48, permitting side-to-side arcuate movement of the wheeled trailer support device 10 with respect to the slip-in camper 11. It should also be noted that the handle 66, when locked in a forward or open free position, causes the homing rod 59 to depress the leaf spring of the spring operated means 52 permitting the trailer support device 10 to track a road surface during transportation of a slip-in camper 11. Preferably the wheels 42 of the trailer support device 10 track with the pickup truck 12 at high speeds, similar to the operation of a towed boat trailer.

A stop 68 limits the forward rotation of the homing rod 59. (FIGS. 6, 7) The stop 68 is preferably affixed to, and extends forwardly from, a second trailer bracket 70 having a second towing ball 72. The second trailer bracket 70 is preferably affixed to the rear of the slip-in camper 11 equal distances between the two sides. The second trailer bracket 70 preferably extends downwardly for a distance sufficient to position the second towing ball 72 on an approximate horizontal plane with the ledge plate 46. The second trailer bracket 70, and second towing ball 72, are preferably formed of a sturdy metal material as is known in the art. It should be noted that the depending plate 74 of the second bracket 70 is of sufficient length to support the spring operated means 52 and the stop 68.

The stop 68 is preferably U-shaped and is formed of a sturdy metal material. The stop 68 may have a circular or rectangular cross sectional dimension at the preference of an individual. The stop 68 is preferably affixed to the depending plate 74 of the second trailer bracket 70 by welding. The front edge 76 of the stop 68 is preferably positioned forwardly toward the notch 48 a distance equal to, or less than, the forward distance established by the junction between the parallel edges 56 and the arcuate edge 58 of the ledge plate 46, during engagement of the homing rod 59 to the notch 48. (FIG. 6) During release or decoupling of the homing rod 59 from the notch 48, the wheeled trailer support device 10 may then move from side to side about an arcuate path proximal to either side of a slip-in camper 11. Following arcuate movement of the wheeled trailer support device 10, the front edge 76 of the stop 68 prevents the spring operated means 52 from biasing the homing rod 59 into a forward position where the homing rod 59 would engage one of the two parallel edges 56 upon return of the wheeled trailer support device 10 to a substantially central position with respect to the slip-in camper 11. The front edge 76 of the stop 68 thereby positions the homing rod 59 in a restricted forward position, such that the homing rod 59 engages the arcuate edge 58 of the ledge plate 46 upon return of the trailer support device 10 to a central position. The homing rod 59 is thereby permitted to slide from side to side along the arcuate edge 58 until realignment occurs with the notch 48. The spring operated means 52 then biases the homing rod 59 into the notch 48 for coupling of the frame 24 to the wheeled trailer support device 10. It should be noted that the stop 68 preferably surrounds the homing rod 59.

A spring operated means 52 is preferably affixed to, and interposed between, the forward face of the depending plate 74 of the second trailer bracket 70 and the homing rod 59 of the releasable latching means 50. The spring operated means 52 is preferably a leaf spring which may be attached to the second trailer bracket 70 by any preferred means including but not limited to welding, rivets, and/or nuts and bolts at the preference of an individual. A portion of the spring operated means 52 is continuously in contact with the homing rod 59 during use of the wheeled trailer support device 10. It should be noted that any preferred spring mechanism may be used as the spring operated means 52 at the preference of an individual, provided that the essential functions, features, and attributes described herein are not sacrificed.

The spring operated means 52 presses the homing rod 59, in a forward direction, into the notch 48, during the fixed positioning of the trailer support device 10 with respect to the slip-in camper 11. The trailer support device 10 is preferably in a fixed or locked position with respect to the slip-in camper 11 during the backing of the camper 11 and pickup truck 12. In order to decouple the homing rod 59 from the notch 48, and individual pulls the handle 66 in a forward direction, which pivots the release rod 60 and homing rod 59 in a rearward direction, compressing the leaf spring of the spring operated means 52. Upon release of the handle 66, the spring operated means 52 expands, biasing the homing rod 59 in a forward direction for engagement to the front edge 76 of the stop 68, or to the arcuate edge 58 of the ledge plate 46. If the trailer support device 10 has moved laterally, terminating engagement between the homing rod 59 and the arcuate edge 58, then the leaf spring expands to a maximum allowed configuration, biasing the homing rod 59 against the stop 68. When the trailer support device 10 approaches realignment with respect to the pickup truck 12, the arcuate edge 58 of the ledge plate 46 engages in the homing rod 59, which slightly comprises the leaf spring of the spring operated means 52. As the homing rod 59 slides along the arcuate edge 58, the leaf spring continues to compress until alignment between the homing rod 50 and the notch 48 occurs. Expansion of the leaf spring then actuates the homing rod 59 into locking engagement within the notch 48 fixedly positioning the wheeled trailer support device 10 with respect to the slip-in camper 11.

A sliding bearing means 54 is preferably affixed to the underside of the frame of the slip-in camper 11. (FIGS. 3, 4) The sliding bearing means 54 is preferably a friction plate formed of a high density polyethylene material. Alternatively, the friction plate may be formed of a high density polyteflon material at the preference of an individual. The sliding bearing means 54 may be any shape as preferred by an individual and preferably corresponds to the path of possible side-to-side arcuate movement of the trailer support device 10. The sliding bearing means 54 preferably traverses the entire width of the underside of the slip-in camper 11, which may exceed seven feet and eleven inches. In general, the sliding bearing means 54 is substantially semi-circular in shape having a radius equal to the length of the towing arm 30 of the wheeled trailer support device 10. The sliding bearing means 54 preferably has a width equal to the dimensions of the engagement face 36.

A portion of the sliding bearing means 54 is preferably continuously engaged to the engagement face 36 of the platform 34 during use of the wheeled trailer support device 10. During operation, as the wheeled trailer support device 10 changes position with respect to the slip-in camper 11, the engagement face 36 of the platform 34 slides along the friction plate of the sliding bearing means 54, facilitating the support of the extended length of the camper. The sliding bearing means 54 permits the free side-to-side movement of the engagement face 36 arcuately along the friction plate following release of the homing rod 59 from the ledge plate 46. It is expected that the sliding bearing means 54 functions in conjunction with the engagement face 36 to provide a mechanism for the smooth, snag free side-to-side movement of the wheeled trailer support device 10, with respect to the slip-in camper 11, during transportation around corners or through curves.

The sliding bearing means 54 may be attached to the frame of the underside of the slip-in camper 11 by any preferred means including but not limited to nuts and bolts, screws, and/or adhesives at the preference of an individual.

Alternatively, the sliding bearing means 54 may include a plurality of rollers or bearing arrangements at the preference of an individual, for cooperation with platform 34, in support of a slip-in camper 11.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A combination wheeled trailer support device, slip-in camper, and pickup truck, the combination wheeled trailer support device comprising:

a. a bracket having a towing ball, said bracket being affixed to said slip-in camper;

b. an elongate frame having a towing arm engaged on said towing ball;
c. a support platform affixed on said frame and having an engagement face;
d. a pair of support wheels and support means mounting said wheels on said frame; and
e. a sliding bearing means affixed to said slip-in camper and engaging said engagement face of said platform permitting said platform and said frame to swing from side to side about said towing ball during travel of said truck and camper.

2. The combination wheeled trailer support device according to claim 1, wherein releasable latching means are interposed between said frame and said slip-in camper to prevent side-to-side swinging of said frame, said latching means engaging said frame adjacent said support platform.

3. The combination wheeled trailer support device according to claim 2, wherein a spring operated means engages said latching means between said frame and said slip-in camper and a releasing means engages said latching means to decouple said latching means from said frame permitting said side-to-side swinging movement of said frame.

4. The combination wheeled trailer support device according to claim 2, wherein releasing means operates said releasable latching means and comprises:
a. a release rod pivotally affixed to said slip-in camper; and
b. a lever affixed to and extending upwardly from said release rod exterior to said slip-in camper.

5. The combination wheeled trailer support device according to claim 3, wherein said latching means further comprises a homing rod affixed to and depending from said release rod.

6. The combination wheeled trailer support device according to claim 1, wherein said towing arm extends rearwardly from said bracket a distance to retain said support platform in engagement with said sliding bearing means.

7. The combination wheeled trailer support device according to claim 1, wherein said support means operates independently between said pair of wheels.

8. The combination wheeled trailer support device according to claim 1, wherein said support means comprises independent torsion arms.

9. The combination wheeled trailer support device according to claim 5, wherein said frame further comprises a base having a rearwardly extending ledge plate having a notch.

10. The combination wheeled trailer support device according to claim 9, wherein said spring operated means comprises a leaf spring engaged to said slip-in camper and to said homing rod for positioning of said homing rod into said notch.

11. The combination wheeled trailer support device according to claim 10, further comprising a handle pivotally affixed to said pickup truck proximal to a driver's door, said handle having a rearward extending cable affixed to said slip-in camper and to said lever, said handle and said cable adapted for pivotal manipulation and release of said homing rod from said notch.

12. The combination wheeled trailer support device according to claim 11, further comprising said slip-in camper having a rear, and a second bracket having a second towing ball, said second bracket being affixed to, and extending downward from, said rear of said slip-in camper.

13. The combination wheeled trailer support device according to claim 12, wherein said spring operated means is affixed to said second bracket between said second bracket and said homing rod.

14. The combination wheeled trailer support device according to claim 1, wherein said sliding bearing means is arcuate in shape.

15. The combination wheeled trailer support device according to claim 1, wherein said sliding bearing means is a friction plate.

16. The combination wheeled trailer support device according to claim 15, wherein said friction plate is coated with a friction reducing material.

17. The combination wheeled trailer support device according to claim 16, wherein said friction reducing material is selected from the group consisting of high density polyteflon and polyethylene.

18. The combination wheeled trailer support device according to claim 14, wherein said sliding bearing means is a plurality of rollers.

19. A combination wheeled trailer support device, slip-in camper, and pickup truck, the combination wheeled trailer support device comprising:
a. a bracket having a towing ball, said bracket being affixed to said slip-in camper;
b. an elongate frame having a towing arm engaged on said towing ball;
c. a support platform having an engagement face affixed to said frame:
d. a pair of support wheels and support means mounting said wheels on said frame;
e. a sliding bearing means affixed to said slip-in camper and engaging said engagement face of said platform permitting said platform and said frame to swing from side to side about said towing ball during travel of said truck and camper;
f. a releasable latching means interposed between said frame and said slip-in camper preventing side-to-side swinging of said frame, said latching means engaging said frame adjacent said support platform;
g. a spring operated means engaging said latching means between said frame and said slip-in camper to prevent said side-to-side swinging movement therebetween; and
h. a releasing means for decoupling said latching means from said frame permitting said side-to-side swinging movement of said frame with respect to said slip-in camper.

20. A combination wheeled trailer support device, slip-in camper, and pickup truck, the combination wheeled trailer support device comprising:
a. a U-shaped bracket having a towing ball, said bracket being affixed to said slip-in camper proximal to said pickup truck;
b. an elongate frame having a towing arm having a ball hitch engaged on said towing ball, said elongate frame extending rearwardly from said bracket;
c. a platform affixed on said frame and having an engagement face;
d. a friction plate affixed to said slip-in camper, a portion of said friction plate engaging said engagement face of said platform for swinging said frame from side to side about said towing ball during travel of said truck and camper;
e. a pair of wheels and support means mounting said wheels on said frame;

f. a ledge plate affixed to and extending rearwardly from said frame, said ledge plate having a notch;

g. a releasable homing rod interposed between said frame and said slip-in camper, said homing rod being releasably engaged to said notch preventing side-to-side swinging of said frame;

h. a spring operated means engaging said homing rod between said frame and said slip-in camper to prevent said side-to-side swinging movement therebetween, said spring operated means biasing said homing rod into said notch; and i. a releasing means affixed to said slip-in camper for decoupling said homing rod from said notch permitting said side-to-side swinging movement of said frame.

* * * * *